United States Patent [19]

Walter et al.

[11] Patent Number: 4,563,166
[45] Date of Patent: Jan. 7, 1986

[54] EXTRA-RESILIENT SHAFT COUPLING

[75] Inventors: Jürgen Walter, Haltern-Hullern; Ulrich Falz; Manfred Lunke, both of Dortmund, all of Fed. Rep. of Germany

[73] Assignee: Hackforth GmbH & Co. KG, Herne, Fed. Rep. of Germany

[21] Appl. No.: 592,865

[22] Filed: Mar. 23, 1984

[30] Foreign Application Priority Data

Mar. 24, 1983 [DE] Fed. Rep. of Germany ....... 3310695

[51] Int. Cl.4 .............................................. F16D 3/56
[52] U.S. Cl. ........................................ 464/96; 464/92
[58] Field of Search ...................... 464/92, 85, 87, 99, 464/96, 88

[56] References Cited

U.S. PATENT DOCUMENTS

| | | | |
|---|---|---|---|
| 2,207,496 | 7/1940 | Anderson | 464/96 |
| 2,486,078 | 10/1949 | Tocci-Guilbert | 464/88 |
| 2,633,008 | 3/1953 | Tocci-Guilbert | 464/87 |
| 2,742,769 | 4/1956 | Gleeson et al. | 464/92 |
| 2,860,496 | 11/1958 | Tocci-Guilbert | 464/92 |
| 2,910,843 | 11/1959 | Happ et al. | 464/96 |
| 2,973,633 | 3/1961 | Hall | 464/96 |
| 3,023,593 | 3/1962 | Nallinger | 464/96 |
| 4,063,433 | 12/1977 | Chanton | 464/88 |

FOREIGN PATENT DOCUMENTS

| | | | |
|---|---|---|---|
| 2727963 | 3/1978 | Fed. Rep. of Germany | 464/92 |
| 586599 | 3/1947 | United Kingdom | 464/96 |

*Primary Examiner*—Stephen Marcus
*Assistant Examiner*—Leo James Peters
*Attorney, Agent, or Firm*—Becker & Becker, Inc.

[57] ABSTRACT

An extra-resilient shaft coupling. Two rigid parts are interconnected by a resilient intermediate member which transmits torque. The intermediate member includes two external metal ring members which are in the form of one or more peripheral parts and are interconnected by an elastomeric material, preferably vulcanized in situ. To avoid over-stressing the elastomeric material at the regions adjacent to the metal parts, the ring members, near the outer peripheral surface of the rubber element, are provided with an axially projecting annular shoulder which abuts an edge region of the rubber element. The inner peripheral edge of the ring members has an approximately V cross-section, the point of the V being rounded and the outer side surface being recessed relative to the outer surface of the ring member to thus form a peripheral recess for receiving a lip formed on the rubber element. In the case of an intermediate member which is divided into segments, the abutting edges of the metal segments are formed in the same member as the inner peripheral edge of the ring members.

6 Claims, 7 Drawing Figures

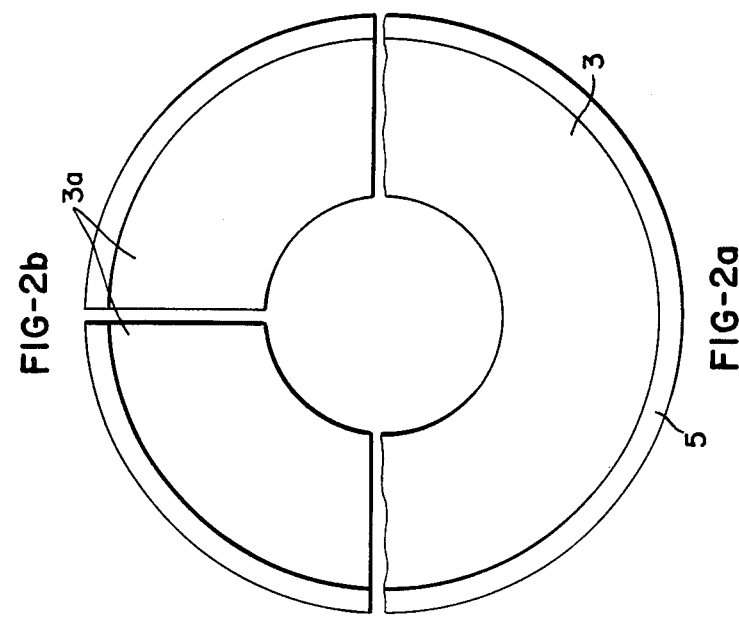
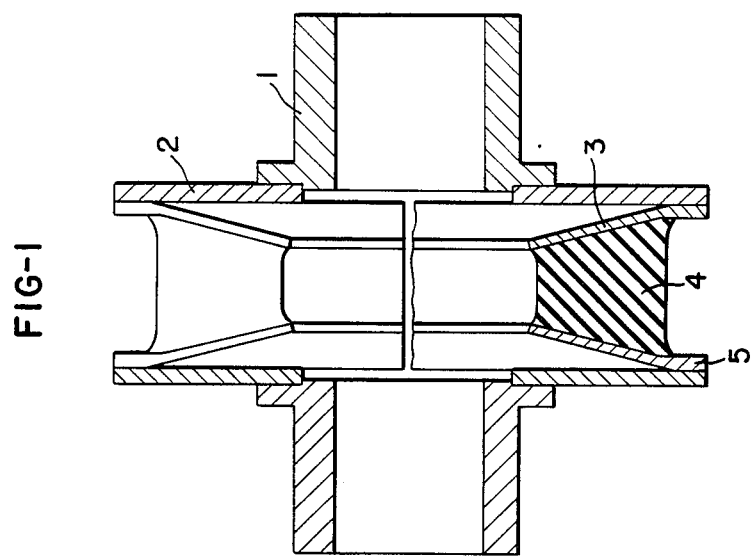

EXTRA-RESILIENT SHAFT COUPLING

BACKGROUND OF THE INVENTION

1. Field of the Invention

The present invention relates to an extra-resilient shaft coupling and provides a resilient intermediate member for transmitting torque between two rigid coupling parts. The resilient intermediate member includes external metal ring members in one or more peripheral parts. The ring members are connected with one another in a continuous or segmented fashion by an elastomeric material, such as rubber or plastic, which is preferably vulcanized in situ.

2. Description of the Prior Art

Shaft couplings of this type are known. It has been found in practice that peak stresses occur at the edge areas of the rubber element, which is secured for example by being vulcanized to metal parts of the aforementioned extra resilient shaft couplings. In the same areas, faults may occur in the rubber element because of the inevitable escape of material (flash) during vulcanization, and may reduce the strength. If the shaft coupling is dynamically stressed, the combination of both influences may overstrain the rubber elements and cause premature failure of the shaft coupling.

However, tension in the resilient material is caused not only by transmission of torque during operation, but also by centrifugal force. This is another cause of additional stresses in the boundary regions of the rubber element, which is usually at greater risk than the other areas.

An object of the present invention is to improve and develop an extra-resilient shaft coupling in such a way as to efficiently prevent undesirable over-stressing of the rubber element at the areas adjacent to the metal parts.

BRIEF DESCRIPTION OF THE DRAWINGS

This object, and other objects and advantages of the present invention, will appear more clearly from the following specification in conjunction with the accompanying drawings, in which:

FIG. 1 is a view taken as a diagrammatic axial section through one inventive embodiment of a shaft coupling having a resilient intermediate member;

FIGS. 2a and 2b are half side views of resilient intermediate members, with FIG. 2a being a one-part ring member, and FIG. 2b being a ring member which is divided into four equal segments;

SUMMARY OF THE INVENTION

Figures 3, 6:
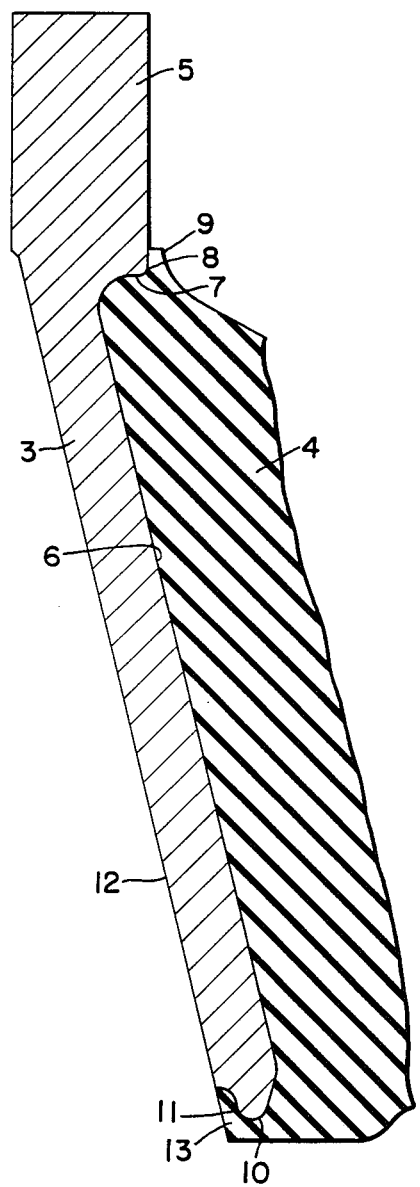
FIG. 3 is a sectional view of a ring member or metal segment in an axial plane and on a larger scale.
FIG. 6 is a view that shows part of a segment in section in the plane of line VI—VI in FIG. 5.

The shaft coupling of the present invention is characterized primarily by the following features:

an axially projecting annular shoulder, which abuts an edge region of the rubber element, is formed on the ring members near the outer peripheral surface;

the inner peripheral edge of the ring members has an approximately V-shaped cross-section, the tip being rounded and the outer side of the V being recessed relative to the outer surface of the ring member in order to thus form a peripheral recess; and a lip is formed on the rubber element in the vicinity of the inner peripheral edge of the ring member and surrounds this edge and fills the peripheral recess in such a way that it is flush with the outer surface.

As a result of the peripheral or circumferential annular shoulder on the metal part, the outer surface of the rubber element is provided with effective radial support, which prevents peak stresses in this region. This support also counteracts the centrifugal force in the rubber element by absorbing it so that it cannot affect the adhesive surfaces of the rubber element.

The inner surface of the rubber element is formed at the edge into a lip which surrounds a rounded edge of the metal ring member and is embedded at the outside in a peripheral recess. This feature increases the free spring length of the rubber element and thus reduces stretching caused by deformation due to torque. The integrally-formed lip also displaces the end of the rubber/metal boundary towards the back of the ring member, out of the force-transmitting region.

When the rubber element is vulcanized, rubber is ejected and washes some bonding material away from the region adjacent the metal. This may result in separation or cracks in the rubber, which may become unserviceable. As a result of the ejection, the boundary regions are often rough, so that the rubber element has to be mechanically trimmed at these places. Trimming of the rubber element at force-transmitting areas requires considerable care and there is inherently a high risk that the element will have to be scrapped.

To this end, according to another feature of the invention, each rubber element, on the outer peripheral surface, may be extended into a flat edge strip which projects beyond the free edge of the annular shoulder. In this manner the rubber/metal boundary is moved sufficiently from the force-transmitting area to prevent ejected material and any trimming work from damaging the stressed part of the rubber element. The same purpose is served by the lip formed at the inner peripheral edge of the ring member on the rubber element.

According to another feature of the invention, in the case of a shaft coupling in which the resilient intermediate member is divided into segments, the abutting edges of the segments can be formed in the same manner as the inner peripheral edge of the ring members, i.e. the abutting edges have an approximately V cross-section, the tip being rounded and the outer side surface being recessed relative to the outer surface of the metal segment to thus form a recess; a lip which surrounds the sectional edge is formed on the rubber element and fills the recess in a flush relationship with the outer surface.

In the case of a resilient intermediate member which is divided into segments, considerable peak stresses may occur at the outer corners of the segments during operation. To counteract these, according to another advantageous feature, the annular shoulder, at the outer corners of the metal segments, is extended upwards in a curve as far as the peripheral edge, and an integrally formed tongue of the rubber element extends as far as the peripheral edge.

Furthermore, in the case of a resilient intermediate member divided into segments, the stresses at the abutting faces will often result in undesirable buckling of the rubber, thus bridging the space between two adjacent segments, so that the adjacent abutting surfaces may rub together and wear or damage the rubber elements. To prevent this, according to another advantageous feature of the present invention, the radial abutting faces of the sector-shaped rubber elements may be concave in the part between the radial abutting edges of the metal segments. The axial edges on the rubber elements may be rounded between the abutting face and the outer or inner surface respectively.

DESCRIPTION OF PREFERRED EMBODIMENTS

Referring now to the drawings in detail, FIG. 1 shows an extra-resilient shaft coupling comprising similar rigid parts connected by a resilient intermediate member. Each coupling part comprises a hub 1 and an annular flange 2 secured to the inner side of hub 1. The resilient intermediate member comprises two metal ring members 3, and an annular rubber member 4 which connects the members 3. The radial outer edge of each member 3 is formed by a connecting flange 5 which is firmly secured by screws (not shown) to the adjacent flange ring 2. In the inner region, the flange rings 3 extend conically toward one another.

Smaller shaft couplings advantageously have a one-part resilient intermediate member, i.e. both the members 3 and the intermediate rubber member 4 form a continuous ring. In larger shaft couplings, the resilient intermediate member is divided into segments, mainly for manufacturing reasons. The size of the vulcanizing mold can thus be limited to the size of each segment. A segmented intermediate member is also advantageous when assembling or dismantling large shaft couplings.

FIG. 3 shows the cross-section of a ring member, whether continuous or segmented, in an axial plane. The cross-section of the connecting flange 5 is shown at the top end. The inner wall 6 of the member 3 merges at the top into an axially projecting annular shoulder 7, which surrounds an edge region of rubber member 4 or 4a. At the outer edge 8 of the annular shoulder 7, the rubber member 4 has a flat edge strip 9 which abuts the inner wall of the flange 5.

The inner peripheral edge 10 of the member 3 has an essentially V cross-section, the tip of the V being rounded, and the outer side surface 11 extending back toward the outer surface 12, thus forming a peripheral recess. At the inner peripheral edge 10, the rubber member 4 or 4a has a lip 13 which surrounds the edge 10 and fills the recess at the outside of the member 3 in such a way that a flush relationship exists with respect to the outer surface 12.

Figure 5:
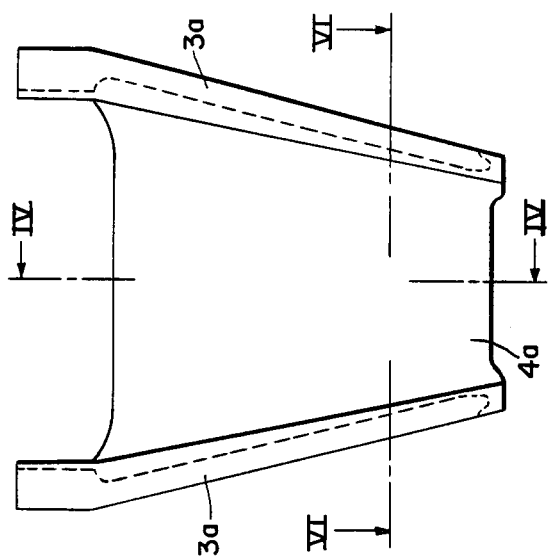
FIG. 5 is a view of an abutting or connecting end of a segment.

FIG. 5 shows the contours of the inner and outer peripheral surfaces of the rubber member 4 or 4a, and its position relative to the members 3 or the metal segments 3a.

When an intermediate member of the aforementioned type is manufactured, the two ring members 3 are placed in a mold and the space between the members 3 is filled with rubber material under pressure. It is usually impossible to prevent rubber material from escaping at the edges, i.e. at the edge 8 and at the inner peripheral edge 10. The integrally-molded edge strip 9 and lip 13 ensure that any escaping rubber is kept to the outside of the force-transmitting regions of the rubber member. These projecting edge strips can be subsequently trimmed if necessary without risk of damaging the inner rubber member. At the inner peripheral edge 10, the boundary region of the rubber member, which is at particular risk as previously explained, is moved to the rear side of the ring member, i.e. outside the stressed areas of the rubber member 4 between the ring members.

Figure 4:
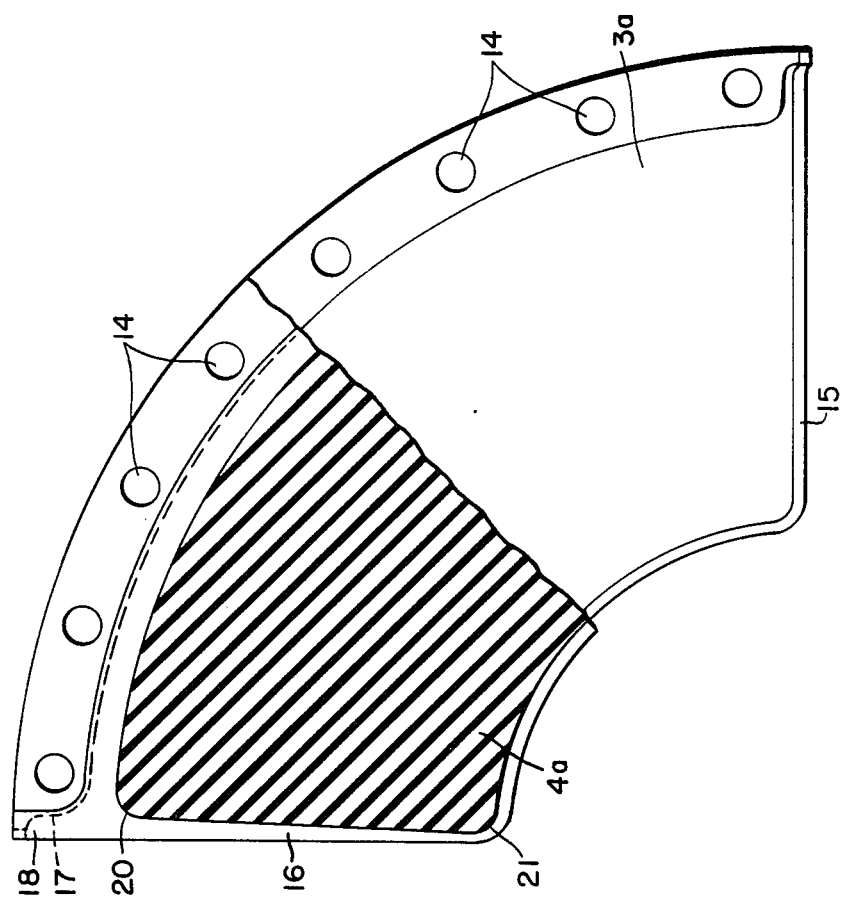
FIG. 4 is a side view of a segment, the left half being a section in the plane of line IV—IV of FIG. 5, and the right-half being a view of the inner surface of the metal segment.

The aforementioned embodiment is equally suitable for a segmented resilient intermediate member. The shaping of the abutting faces of the individual identical segments is an additional feature. FIG. 4 shows a segment of a four-part intermediate ring. The right half of the segment shows the inside of the metal segment, and the left half is a section in the plane of line IV—IV in FIG. 5. The outer periphery of metal segment 3a has a flange 5 which is provided with a number of bores 14 for receiving fastening screws. The radial abutting edges 15 of the segments 3a, which form the ring members, have the same cross-section as the inner peripheral edge 10. The same applies to the rubber member 4a, which as before is formed with an external lip 16 at the abutting edges, as shown in FIG. 6.

At the outer corners of the segments 3a, the shoulder 7 is bent towards the peripheral edge of the flange 5, where the shoulder 7 extends radially at 17 to near the peripheral edge. At this location, the member 4a has a tongue 18 which extends to the peripheral edge of the flange 5.

At the inner corners of the segments 3a, the inner peripheral edge 10 merges in a curve into the abutting edge 15, which has a similar cross-section.

As FIG. 6 shows, the radial abutting face 19 of the member 4a is concave in the part between the edges 15. The axial edges 20, 21 of the member 4a are rounded, as shown in FIG. 4.

The present invention is, of course, in no way restricted to the specific disclosure of the specification and drawings, but also encompasses any modifications within the scope of the appended claims.

What we claim is:

1. An extra-resilient shaft coupling comprising in combination a resilient intermediate member for transmitting torque between two rigid coupling parts; said resilient intermediate member comprising:
   two metal ring members, each of which is secured to a different one of said coupling parts and consists of one or more circumferentially extending parts; each ring member including a radially inner peripheral edge having an approximately v-shaped cross-section, the tip of which is rounded, and that side thereof which is remote from the other ring member being recessed peripherally and continuously relative to that side of said ring member which is remote from the other ring member, thus forming a circumferentially extending recess; and
   an annular member of elastomeric material for interconnecting said ring members, said annular elastomeric member similarly consisting of one or more circumferentially extending parts; said annular elastomeric member having a radially outer edge region and a radially outer peripheral surface, in the vicinity of which each of said ring members is provided with an axially projecting peripheral annular shoulder which abuts said radially outer region of said annular elastomeric member provided thereby with effective radial support, which prevents peak stresses therewith and also counteracts centrifugal force in said annular member of elastomeric material by absorbing such centrifugal force thereby to avoid any affect upon adhesive surfaces of said annular elastomeric member due to torque and centrifugal force cooperating otherwise to result in overstressing and overloading along such adhesive surfaces which would result in premature damaging and also destruction of the elastomeric material in edge regions thereof; in the vicinity of said inner peripheral edge of each of said rings members, said annular elastomeric member being provided with an integrally-formed lip which surrounds said inner peripheral edge and fills said circumferentially extending recess of said ring member in such a way that said lip is flush with that side of said ring member which is remote from the other ring member and that free spring length of said annular member of elastomeric material is increased and thus reduces stretching thereof caused by deformation due to torque, said integrally-formed lip also displacing an end of metal/elastomeric material boundary towards a back of a respective ring member out of force-transmitting location and to avoid overstressing of elastomeric material in locations adjacent to the metal ring member respectively.

2. An extra-resilient shaft coupling comprising in combination a resilient intermediate member for transmitting torgue between two rigid coupling parts; said resilient intermediate member comprises:

two metal ring members, each of which is secured to a different one of said coupling parts and consists of one or more circumferentially extending parts; each ring member has a radially inner peripheral edge having an approximately v-shaped cross-section, the tip of which is rounded, and that side thereof which is remote from the other ring member is recessed relative to that side of said ring member which is remote from the other ring member, thus forming a circumferentially extending recess; and an annular member of elastomeric material for interconnecting said ring members, said annular elastomeric member similarly consisting of one or more circumferentially extending parts; said annular elastomeric member having a radially outer edge region and a radially outer peripheral surface, in the vicinity of which each of said ring members is provided with an axially projecting annular shoulder which abuts said radially outer edge region of said annular elastomeric member provided thereby with effective radial support, which prevents peak stresses therewith and also counteracts centrifugal force in said annular member of elastomeric material by absorbing such centrifugal force; in the vicinity of said inner peripheral edge of each of said ring members, said annular elastomeric member being provided with an integrally-formed lip which surrounds said inner peripheral edge and fills said circumferentially extending recess of said ring member in such a way that said lip is flush with that side of said ring member which is remote from the other ring member and that free spring length of said annular member of elastomeric material is increased and thus reduces stretching thereof caused by deformation due to torque, said integrally-formed lip also displacing an end of metal/elastomeric material boundary towards a back of a respective ring member out of force-transmitting location and to avoid overstressing of elastomeric material in locations adjacent to the metal ring member respectively, said ring members and said annular elastomeric member each being divided into two or more circumferentially extending segments; the abutting edges of the segments of a given one of said ring members each having an approximately v-shaped cross-section the tip of which is rounded, and that side of which remote from the other segmented ring member being recessed relative to that side of said ring member which is remote form the other ring member, thus forming a radially extending recess; said segments of said annular elastomeric member being provided with further lips which surround said v-shaped abutting edges of said ring member segments and fill said radially extending recesses of the latter in such a way that said further lips are flush with that side of said ring member segments which is remote from the other segmented ring member.

3. An extra-resilient shaft coupling comprising a resilient intermediate member for transmitting torque between two rigid coupling parts; said resilient intermediate member comprises:

two metal ring members, each of which is secured to a different one of said coupling parts and consists of one or more circumferentially extending parts; each ring member has a radially inner peripheral edge having an approximately v-shaped cross-section, the tip of which is rounded, and that side thereof which is remote from the other ring member is recessed relative to that side of said ring member which is remote from the other ring member, thus forming a circumferentially extending recess; and an annular member of elastomeric material for interconnecting said ring members, said annular elastomeric member similarly consisting of one or more circumferentially extending parts; said annular elastomeric member having a radially outer edge region and a radially outer peripheral surface, in the vicinity of which each of said ring members is provided with an axially projecting annular shoulder which abuts said radially outer edge region of said annular elastomeric member; in the vicinity of said inner peripheral edge of each of said ring members, said annular elastomeric member is provided with a lip which surrounds said inner peripheral edge and fills said circumferentially extending recess of said ring member in such a way that said lip is flush with that side of said ring member which is remote from the other ring member; said ring members and said annular elastomeric member each being divided into two or more circumferentially extending segments; the abutting edges of the segments of a given one of said ring members each having an approximately v-shaped cross-section, the tip of which is rounded, and that side thereof which is remote from the other segmented ring member being recessed relative to that side of said ring member which is remote from the other ring member, thus forming a radially extending recess; said segments of said annular elastomeric member being provided with further lips which surround said v-shaped abutting edges of said ring member segments and fill said radially extending recesses of the latter in such a way that said further lips are flush with that side of said ring member segments which is remote from the other segmented ring member; the radially extending abutting faces of said segments of said annular elastomeric member being concave between the radially extending abutting edges of two segments of two different ring members.

4. A shaft coupling according to claim 3, in which said annular elastomeric member, on said outer peripheral surface thereof, is provided with a flat edge strip which projects beyond a free edge of said annular shoulder.

5. A shaft coupling according to claim 3, in which said ring member segments have a radially outer peripheral edge, with each annular shoulder, in the vicinity of the abutting edges of said ring member segments, extending radially outwardly in a curve to said outer peripheral edge; and in which said segments of said annular elastomeric member are provided with intergal tongues which extend to said outer peripheral edge.

6. A shaft coupling according to claim 3, in which the axially extending edges of said segments of said annular elastomeric member, between said abutting edges and at the radially outer and inner peripheral edges of said ring member segments, are rounded.

* * * * *